(12) United States Patent
Tamura

(10) Patent No.: US 9,134,864 B2
(45) Date of Patent: Sep. 15, 2015

(54) ELECTRONIC DEVICE WITH CONTROLLER AND TOUCH PANEL FOR RAPID RESTORATION FROM POWER-SAVING MODE

(71) Applicant: Semiconductor Energy Laboratory Co., Ltd., Atsugi-shi, Kanagawa-ken (JP)

(72) Inventor: Hikaru Tamura, Zama (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 156 days.

(21) Appl. No.: 13/900,884

(22) Filed: May 23, 2013

(65) Prior Publication Data

US 2013/0321333 A1    Dec. 5, 2013

(30) Foreign Application Priority Data

May 31, 2012    (JP) .................................. 2012-124155

(51) Int. Cl.
*G06F 3/044*    (2006.01)
*G06F 1/32*    (2006.01)

(52) U.S. Cl.
CPC ............. *G06F 3/044* (2013.01); *G06F 1/3218* (2013.01); *G06F 1/3231* (2013.01); *G06F 1/3296* (2013.01); *Y02B 60/1285* (2013.01); *Y02B 60/1289* (2013.01)

(58) Field of Classification Search
CPC ..... G06F 3/044; G06F 1/3218; G06F 1/3231; G06F 1/3259; G06F 1/3262; G06F 1/3287; G06F 1/3296; G06F 1/3265; Y02B 60/1285; Y02B 60/1289

See application file for complete search history.

(56) References Cited

U.S. PATENT DOCUMENTS

| | | |
|---|---|---|
| 2010/0188354 A1 | 7/2010 | Tamura |
| 2011/0109592 A1 | 5/2011 | Kurokawa et al. |
| 2011/0149185 A1 | 6/2011 | Yamazaki |
| 2011/0216043 A1 | 9/2011 | Tamura et al. |
| 2011/0221724 A1 | 9/2011 | Kurokawa et al. |
| 2011/0242043 A1 | 10/2011 | Yarvis et al. |
| 2011/0291013 A1 | 12/2011 | Kurokawa et al. |
| 2012/0044223 A1 | 2/2012 | Tamura |
| 2012/0056252 A1 | 3/2012 | Aoki et al. |
| 2012/0146027 A1 | 6/2012 | Tamura et al. |

FOREIGN PATENT DOCUMENTS

| | | |
|---|---|---|
| JP | 2011-233142 | 11/2011 |
| WO | WO 2011/126920 | 10/2011 |

*Primary Examiner* — Larry Sternbane
(74) *Attorney, Agent, or Firm* — Eric J. Robinson; Robinson Intellectual Property Law Office, P.C.

(57) ABSTRACT

To simplify an operation at the time when a controller which can control a touch panel returns to the normal mode. The touch panel includes a capacitive sensor having a pair of electrodes. The controller includes a control switch controlling supply of a potential to one electrode of the capacitive sensor; a current detection circuit detecting current flowing through the other electrode of the capacitive sensor; a power source circuit controlling supply of power source voltage to the current detection circuit; a power supply start switch including a power supply selection transistor whose gate potential is changed in accordance with a potential of the one of the pair of electrodes and controlling output of the power supply start signal to the power source circuit in accordance with a gate potential of the power supply selection transistor; and a control circuit controlling the control switch and the power source circuit.

8 Claims, 11 Drawing Sheets

ELECTRONIC DEVICE WITH CONTROLLER AND TOUCH PANEL FOR RAPID RESTORATION FROM POWER-SAVING MODE

BACKGROUND OF THE INVENTION

1. Field of the Invention

The present invention relates to a controller. Further, the present invention relates to a touch panel including the controller and an electronic device including the touch panel in a panel portion.

2. Description of the Related Art

In recent years, a technique by which power consumption of a touch panel is reduced (a technique for reducing power consumption) has been developed.

As an example of the technique for reducing power consumption, a technique by which the touch panel is turned off or automatically brought into a low-power consumption driving state when the touch panel is not in use has been known.

For example, Patent Document 1 discloses a technique by which a touch panel is turned off in the case where a touch input is not performed for a certain period of time. In Patent Document 1, a touch-event detector which detects a touch input is provided, whereby after the touch panel is turned off, the touch panel can be activated on the basis of a detection result in the touch-event detector.

REFERENCE

Patent Document

[Patent Document 1] Japanese Published Patent Application No. 2011-233142

SUMMARY OF THE INVENTION

As described above, in a conventional touch panel, it is necessary to provide a detection means additionally in order that a controller which can control a touch panel returns to the normal mode (i.e. activated). Therefore, the circuit configuration is complicated, and thus operation at the time when the controller which can control the touch panel returns to the normal mode is also complicated.

An object of one embodiment of the present invention is to at least simplify a circuit or simplify an operation at the time when a controller which can control a touch panel returns to the normal mode.

According to one embodiment of the present invention, an operation at the time when a controller which can control a touch panel returns to the normal mode can be simplified in such a manner that start of operation of a power source circuit is controlled using a switch which is turned on or off depending on whether there is a touch or not.

In a pair of electrodes of the capacitive sensor, one electrode and the other electrode intersect with each other to form capacitance serving as a sensor. A potential is supplied to the one electrode, and the value of current flowing through the other electrode is detected. For example, when a finger approaches the pair of electrodes, parasitic capacitance is generated, and the value of the current is changed. Therefore, whether there is a touch or not can be determined by change in the value of current, for example.

One embodiment of the present invention is a controller which controls operation of a capacitive sensor having a pair of electrodes and includes a control switch having a function of controlling supply of a potential to one electrode of the capacitive sensor; a current detection circuit having a function of detecting current flowing through the other electrode of the capacitive sensor by a change in potential of the other electrode of the capacitive sensor; a power source circuit having a function of controlling supply of power source voltage to an oscillation circuit and the current detection circuit in accordance with a power supply start signal to be input; a power supply start switch which includes a power supply selection transistor whose gate potential is changed in accordance with a potential of the one electrode and which has a function of controlling an output of the power supply start signal to the power source circuit in accordance with the gate potential of the power supply selection transistor; and a control circuit having a function of controlling the control switch and the power source circuit.

Another embodiment of the present invention is a touch panel including a capacitive sensor and the controller.

Another embodiment of the present invention is an electronic device including a display panel using the touch panel.

According to one embodiment of the present invention, a circuit can be simplified because a controller which can control a touch panel can return to the normal mode after being turned off without an additional detection means. Further, the controller can return to the normal mode by turning on or off a switch, and thus an operation at the time when the controller returns to the normal mode can be simplified.

DETAILED DESCRIPTION OF THE INVENTION

Figure 1:
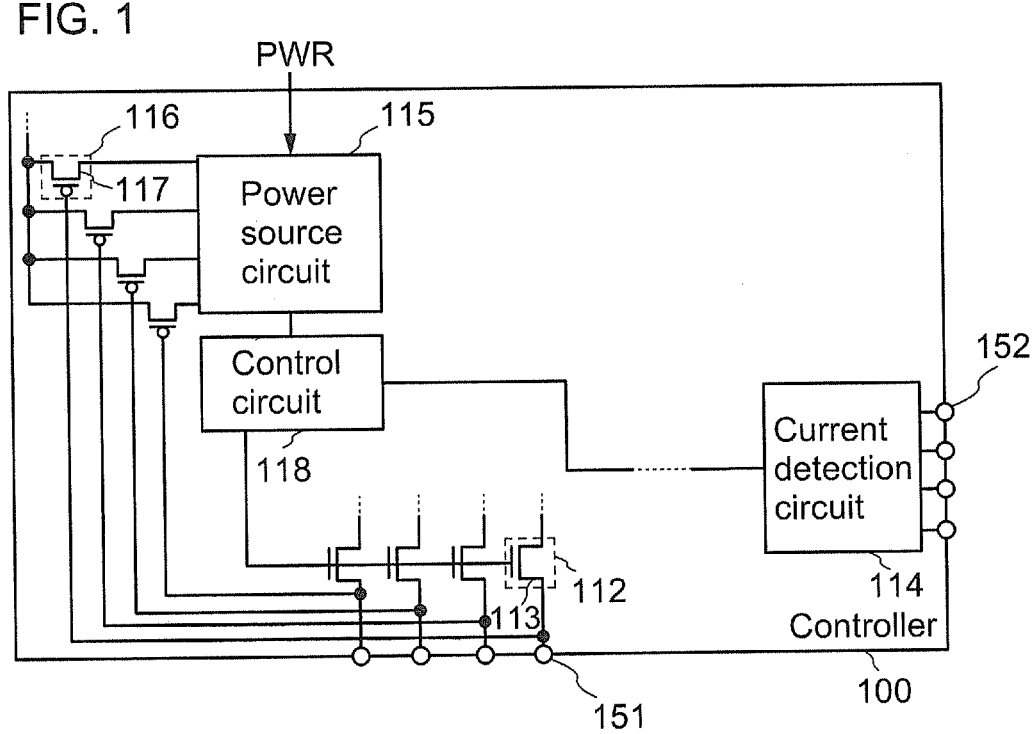
FIG. 1 is a diagram illustrating an example of a controller.

Examples of embodiments of the present invention will be described. Note that it will be readily appreciated by those skilled in the art that details of the embodiments can be modified in various ways without departing from the spirit and scope of the present invention. Thus, the present invention should not be limited to, for example, the description of the following embodiments.

Note that the contents of the embodiments can be combined with each other as appropriate. In addition, the contents of the embodiments can be replaced with each other as appropriate.

Further, the ordinal numbers such as "first" and "second" are used to avoid confusion between components and do not limit the number of each component.

Embodiment 1

In this embodiment, examples of a controller and a touch panel in the case of using a capacitive sensor are described.

First, an example of a controller is described with reference to FIG. 1. A controller 100 illustrated in FIG. 1 includes a control switch 112, a current detection circuit 114, a power source circuit 115, a power supply start switch 116, and a control circuit 118.

Figure 2:
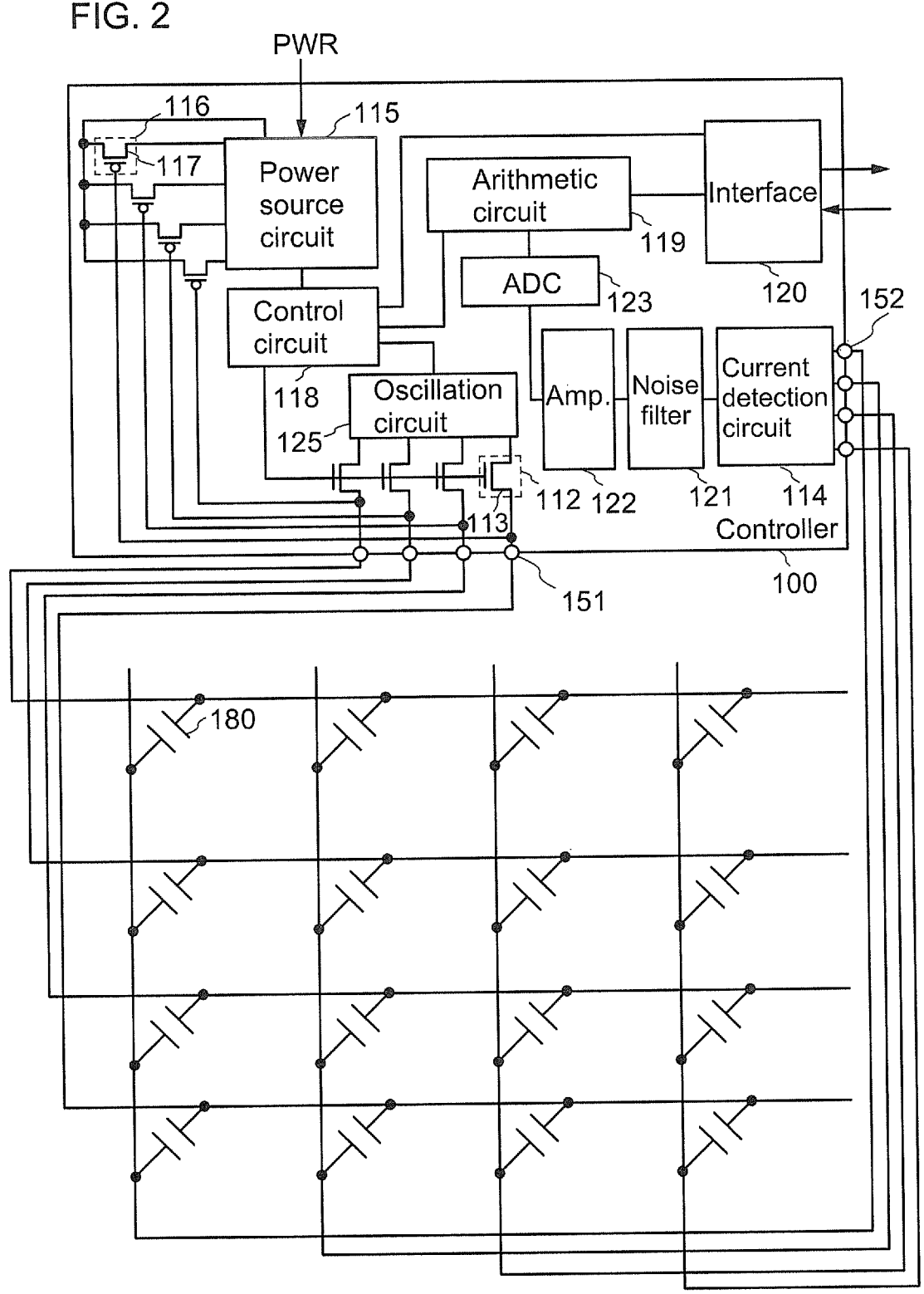
FIG. 2 is a diagram illustrating an example of a touch panel.

Further, an example of the controller 100 is described with reference to FIG. 2. FIG. 2 illustrates an example of a touch panel.

The control switch 112 includes a control transistor 113. The control switch 112 has a function of controlling supply of a potential to each one electrode of pairs of electrodes in capacitive sensors 180 in accordance with a gate potential of the control transistor 113. An output of a signal to each one electrode in the capacitive sensors 180 is controlled by turning on or off the control transistor 113. The number of the control transistors 113 may be plural in accordance with the number of rows of the capacitive sensors 180.

A transistor with low off-state current can be used as the control transistor 113.

The transistor with low off-state current can be, for example, a transistor including a channel formation region that includes an oxide semiconductor with a wider bandgap than silicon and is substantially i-type. Here, the carrier density of the oxide semiconductor is preferred to be lower than $1 \times 10^{14}/cm^3$, more preferably lower than $1 \times 10^{12}/cm^3$, further preferably lower than $1 \times 10^{11}/cm^3$. The transistor including the oxide semiconductor can be fabricated in such a manner that, for example, impurities such as hydrogen or water are reduced as much as possible and oxygen vacancies are reduced as much as possible by supply of oxygen. At this time, the amount of hydrogen regarded as a donor impurity in the channel formation region is preferred to be lower than or equal to $1 \times 10^{19}/cm^3$, more preferably lower than or equal to $1 \times 10^{18}/cm^3$.

For example, an In-based metal oxide, a Zn-based metal oxide, an In—Zn-based metal oxide, or an In—Ga—Zn-based metal oxide can be used as the oxide semiconductor. Alternatively, a metal oxide including another metal element instead of part or all of Ga in the In—Ga—Zn-based metal oxide may be used.

As the aforementioned another metal element, a metal element that is capable of combining with more oxygen atoms than gallium can be used, for example, and specifically one or more elements of titanium, zirconium, hafnium, germanium, and tin can be used, for instance. Alternatively, as the aforementioned another metal element, one or more elements of lanthanum, cerium, praseodymium, neodymium, samarium, europium, gadolinium, terbium, dysprosium, holmium, erbium, thulium, ytterbium, and lutetium may be used. These metal elements function as a stabilizer. Note that the amount of such a metal element added is determined so that the metal oxide can function as a semiconductor. When a metal element that is capable of combining with more oxygen atoms than gallium is used and oxygen is supplied to a metal oxide, oxygen defects in the metal oxide can be reduced.

The oxide semiconductor may be a c-axis aligned crystalline oxide semiconductor (also referred to as CAAC-OS). Further, an oxide semiconductor in a layer form can be applied to the above-described oxide semiconductor.

In each of crystal portions included in the CAAC-OS, the c-axis is aligned in a direction parallel to a normal vector of a surface where an oxide semiconductor layer is formed or a normal vector of a surface of the oxide semiconductor layer, triangular or hexagonal atomic arrangement is formed when seen from the direction perpendicular to the a-b plane, and metal atoms are arranged in a layered manner or metal atoms and oxygen atoms are arranged in a layered manner when seen from the direction perpendicular to the c-axis. In this specification, a simple term "perpendicular" includes a range from 85° to 95°. In addition, a simple term "parallel" includes a range from −5° to 5°.

For example, the CAAC-OS can be formed by a sputtering method with a polycrystalline oxide semiconductor sputtering target. When ions collide with the sputtering target, a crystal region included in the sputtering target may be separated from the target along an a-b plane; in other words, a sputtered particle having a plane parallel to an a-b plane (flat-plate-like sputtered particle or pellet-like sputtered particle) may flake off from the sputtering target. In that case, the flat-plate-like sputtered particle reaches a substrate while maintaining their crystal state, whereby a crystal state of the sputtering target is transferred to a substrate. In this manner, the CAAC-OS is formed.

For the deposition of the CAAC-OS, the following conditions are preferably used.

For example, the CAAC-OS is formed while the impurity concentration is reduced, whereby the crystal state of the oxide semiconductor can be prevented from being broken by the impurities. For example, impurities (e.g., hydrogen, water, carbon dioxide, or nitrogen) which exist in a deposition chamber are preferably reduced. Further, impurities in a deposition gas are preferably reduced. For example, a deposition gas whose dew point is −80° C. or lower, preferably −100° C. or lower is preferably used as a deposition gas.

By increasing the substrate heating temperature during the deposition, migration of a sputtered particle is likely to occur after the sputtered particle is attached to a substrate surface. Specifically, the substrate heating temperature during the deposition is higher than or equal to 100° C. and lower than or equal to 740° C., preferably higher than or equal to 200° C. and lower than or equal to 500° C. By increasing the substrate heating temperature during the deposition, when the flat-plate-like sputtered particle reaches the substrate, migration occurs on the substrate surface, so that a flat plane of the flat-plate-like sputtered particle is attached to the substrate.

Furthermore, it is preferable that the proportion of oxygen in the deposition gas be increased and the power be optimized in order to reduce plasma damage at the deposition. The proportion of oxygen in the deposition gas is 30 vol % or higher, preferably 100 vol %.

As an example of the sputtering target, an In—Ga—Zn—O compound target is described below.

The In—Ga—Zn—O compound target, which is polycrystalline, is made by mixing $InO_X$ powder, $GaO_Y$ powder, and $ZnO_Z$ powder in a predetermined ratio, applying pressure, and performing heat treatment at a temperature higher than or equal to 1000° C. and lower than or equal to 1500° C. Note that x, y, and z are each a given positive number. Here, the predetermined ratio of $InO_X$ powder to $GaO_Y$ powder and $ZnO_Z$ powder is, for example, 2:2:1, 8:4:3, 3:1:1, 1:1:1, 4:2:3, or 3:1:2. The kinds of powder and the molar ratio for mixing powder may be determined as appropriate depending on the desired sputtering target.

A transistor whose channel formation region contains the CAAC-OS has high reliability because change in electric characteristics of the transistor due to irradiation with visible light or ultraviolet light is small.

The transistor containing the oxide semiconductor has low leakage current due to thermal excitation because of its wide bandgap. Further, the effective mass of a hole is heavy, which is 10 or more, the height of the tunnel barrier is high, which is 2.8 eV or higher, and the width of the tunnel barrier is large, which is 25 nm or more. Thus, the amount of tunnel current is small. Furthermore, the number of carriers in the semiconductor layer is very small; therefore, the off-state current can be made low. For example, the off-state current per micrometer of the channel width of the transistor at room temperature (25° C.) is lower than or equal to $1\times10^{-19}$ A (100 zA), preferably lower than or equal to $1\times10^{-22}$ A (100 yA). It is preferable that the off-state current of the transistor be as low as possible; the lowest level of the off-state current of the transistor is estimated to be about $1\times10^{-30}$ A/μm.

The current detection circuit 114 has a function of detecting current flowing to each of the others of the pairs of electrodes of the capacitive sensors 180.

The power source circuit 115 has a function of controlling supply of power source voltage to the current detection circuit 114 in accordance with a power supply start signal to be input.

Figure 3:
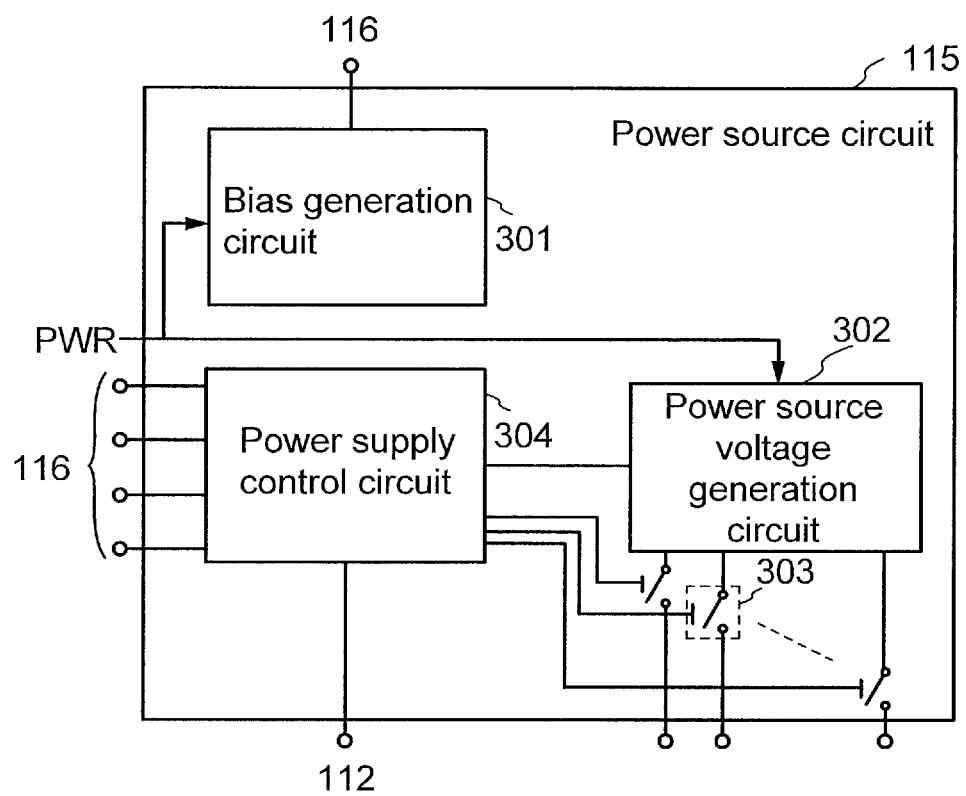
FIG. 3 is a diagram illustrating an example of a power source circuit.

For example, as illustrated in FIG. 3, the power source circuit 115 includes a bias generation circuit 301 which generates a fixed potential on the basis of power source voltage PWR to be supplied; a power source voltage generation circuit 302 which generates power source voltage used for the controller 100 on the basis of the power source voltage PWR to be supplied; a power supply control switch 303 which controls supply of the power source voltage to each circuit block of the controller 100; and a power supply control circuit 304 which controls start and stop of the operation of the power source voltage generation circuit 302 in accordance with a power supply start signal. In the power source circuit 115 illustrated in FIG. 3, a potential generated by the bias generation circuit 301 is intermittently supplied to the power supply control circuit 304 by the power supply control switch 303. The potential intermittently supplied serves as a power supply start signal. The power supply control switch 303 is provided for each circuit block which needs a power source voltage. Note that the bias generation circuit 301 may be provided in a place apart from the power source circuit 115.

The power supply start switch 116 includes a power supply selection transistor 117. A gate potential of the power supply selection transistor 117 is changed in accordance with the potential of each one electrode of the pairs of electrodes of the capacitive sensors 180. The power supply start switch 116 has a function of controlling an output of a power supply start signal to the power source circuit 115 in accordance with the gate potential of the power supply selection transistor 117. Note that although the power supply selection transistor 117 is a p-channel transistor in each of FIG. 1 and FIG. 2, the power supply selection transistor 117 may be an n-channel transistor. Further, the number of the power supply selection transistors 117 may be different from that of the control transistors 113. Furthermore, the power supply start switch 116 may be provided in the power source circuit 115.

The control circuit 118 has a function of controlling a gate potential of the control transistor 113 and the power source circuit in accordance with the value of current detected by the current detection circuit 114.

Further, the controller 100 is electrically connected to each one electrode of the pairs of electrodes of the capacitive sensors 180 through a connection terminal 151. The connection terminal 151 is electrically connected to a gate of the power supply selection transistor 117.

Further, the controller 100 is electrically connected to each of the others of the pairs of electrodes of the capacitive sensors 180 through a connection terminal 152.

Furthermore, as illustrated in FIG. 2, one or more of an arithmetic circuit 119, an interface 120, a noise filter 121, an amplifier circuit 122, an AD converter (also referred to as ADC) 123, and an oscillation circuit 125 may be provided in the controller 100.

The arithmetic circuit 119 has a function of performing arithmetic processing in accordance with a signal input from the interface 120 and a signal input from the current detection circuit 114 through the noise filter 121, the amplifier circuit 122, and the AD converter 123. For example, coordinate data can be generated from the arithmetic circuit 119. A data signal based on the result of the arithmetic processing by the arithmetic circuit 119 is input to the control circuit 118. Thus, the operation of the control circuit 118 is controlled in accordance with the value of current detected by the current detection circuit 114. Further, the data signal based on the result of the arithmetic processing may be output through the interface 120. Furthermore, the control circuit 118 or the arithmetic circuit 119 may be provided with a counter so that a period of time during which there is no touch can be measured by reducing a count value from a reference count value.

The oscillation circuit 125 has a function of generating a pulse signal output to each one electrode of the pairs of electrodes of the capacitive sensors 180. Here, the control transistor 113 has a function of controlling conduction between the oscillation circuit 125 and the capacitive sensors 180. For example, the connection terminal 151 is connected to the oscillation circuit 125 through a source and a drain of the control transistor 113. Further, the gate of the power supply selection transistor 117 is connected to the oscillation circuit 125 through the source and the drain of the control transistor 113.

Figure 4:
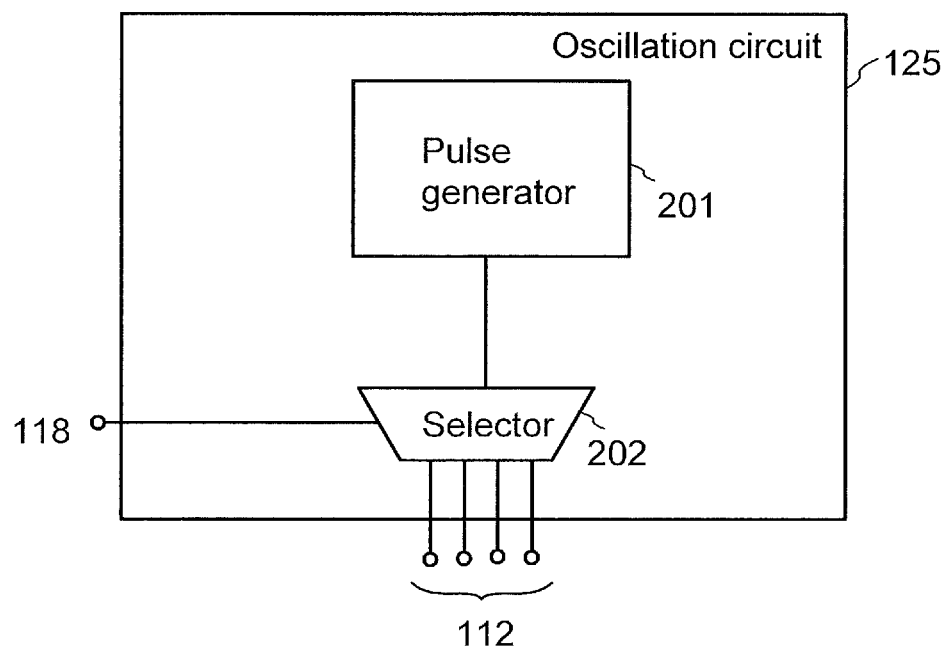
FIG. 4 is a diagram illustrating an example of an oscillation circuit.

For example, as illustrated in FIG. 4, the oscillation circuit 125 includes a pulse generator 201 which generates a pulse signal and a selector 202 which selects an output destination of the pulse signal in accordance with a signal output from the control circuit 118. The selector 202 has a function of selecting the control switch 112 to which the pulse signal is to be output in accordance with the signal output from the control circuit 118. For example, a pulse can be sequentially input from the selector 202 to each one electrode of the pairs of electrodes in the capacitive sensors 180 in plural rows. Alternatively, a pulse can be input from the selector 202 to each one electrode of the pairs of electrodes of the capacitive sensors 180 in plural rows at the same time. The configuration of the oscillation circuit 125 is not limited to that in FIG. 4, and the oscillation circuit 125 may include a shift register or the like. In the case where the oscillation circuit 125 includes a shift register, supply of clock signals is controlled, whereby output destinations of pulses of the shift register can be controlled.

Next, an example of a method for driving the controller and the touch panel is described with reference to a flow chart of FIG. 5 and schematic views of FIG. 6, FIG. 7, and FIG. 8. Note that the case where the power supply selection transistor 117 is a p-channel transistor and the arithmetic circuit 119 includes a counter is described.

Figure 5:
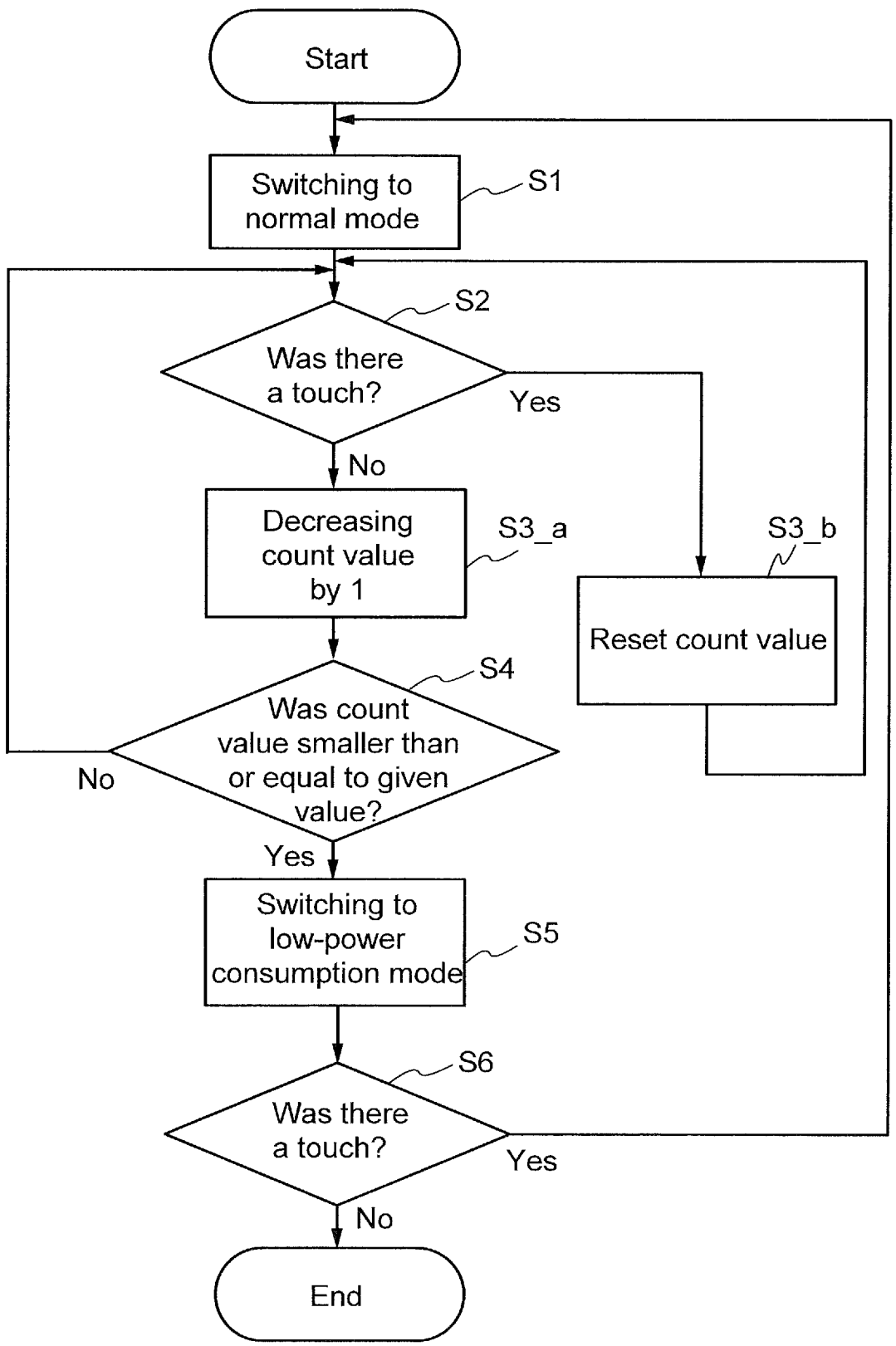
FIG. 5 is a flow chart showing an example of a method for driving a controller.
Figure 6:
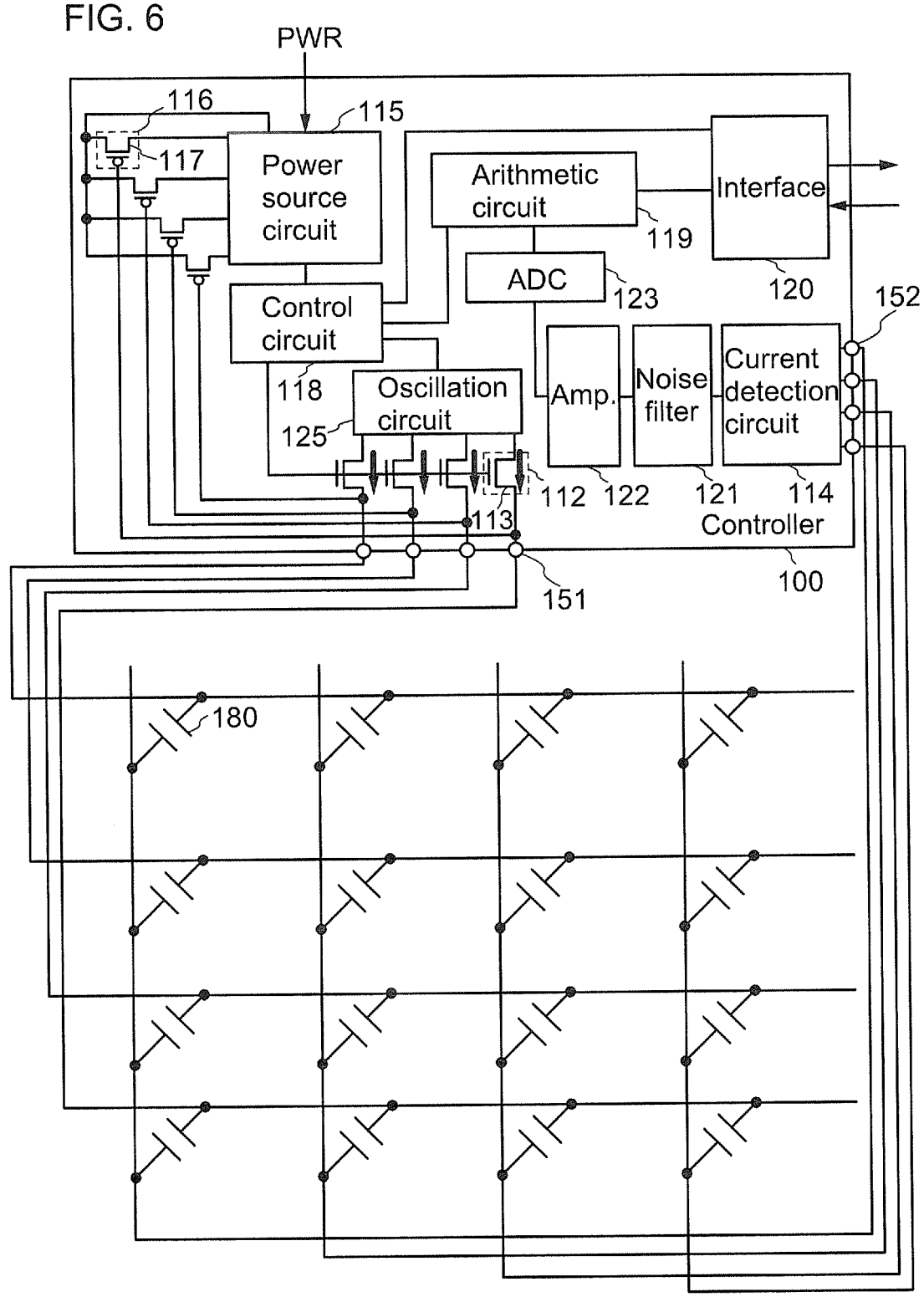
FIG. 6 is a diagram illustrating an example of a method for driving a controller.

First, switching to a normal mode is performed in Step S1 as shown in FIG. 5.

In the normal mode, supply of power source voltage by the power source circuit 115 is started. Further, as illustrated in FIG. 6, the control switches 112 are turned on by the control circuit 118, and thus a pulse signal is output to each one electrode of the pairs of electrodes of the capacitive sensors 180.

Next, whether there is a touch or not is determined in Step S2 shown in FIG. 5. Whether there is a touch or not can be determined in such a manner that a digital signal generated on the basis of whether the values of current detected by the current detection circuit 114 are changed or not is output to the arithmetic circuit 119. Note that in the case where the capacitive sensors 180 are provided in a row direction and a column direction, the coordinate data of the capacitive sensor 180 which has been touched can also be determined on the basis of whether the values of current detected by the current detection circuit 114 are changed or not.

In the case where there is no touch, the count value of the arithmetic circuit 119 is decreased by 1 in Step S3_a. Further, whether the count value is smaller than or equal to a given value or not is determined in Step S4. Note that in the case where there is a touch, the count value is reset and the normal mode is maintained in Step S3_b.

In the case where the count value is smaller than or equal to a given value in Step S4, switching to a low-power consumption mode is performed in Step S5. The low-power consumption mode is a mode in which supply of power source voltage is stopped and an output of a pulse signal to the capacitive sensor 180 is stopped, for example. Note that in the case where the count value is larger than a given value, the normal mode is maintained.

Figure 7:
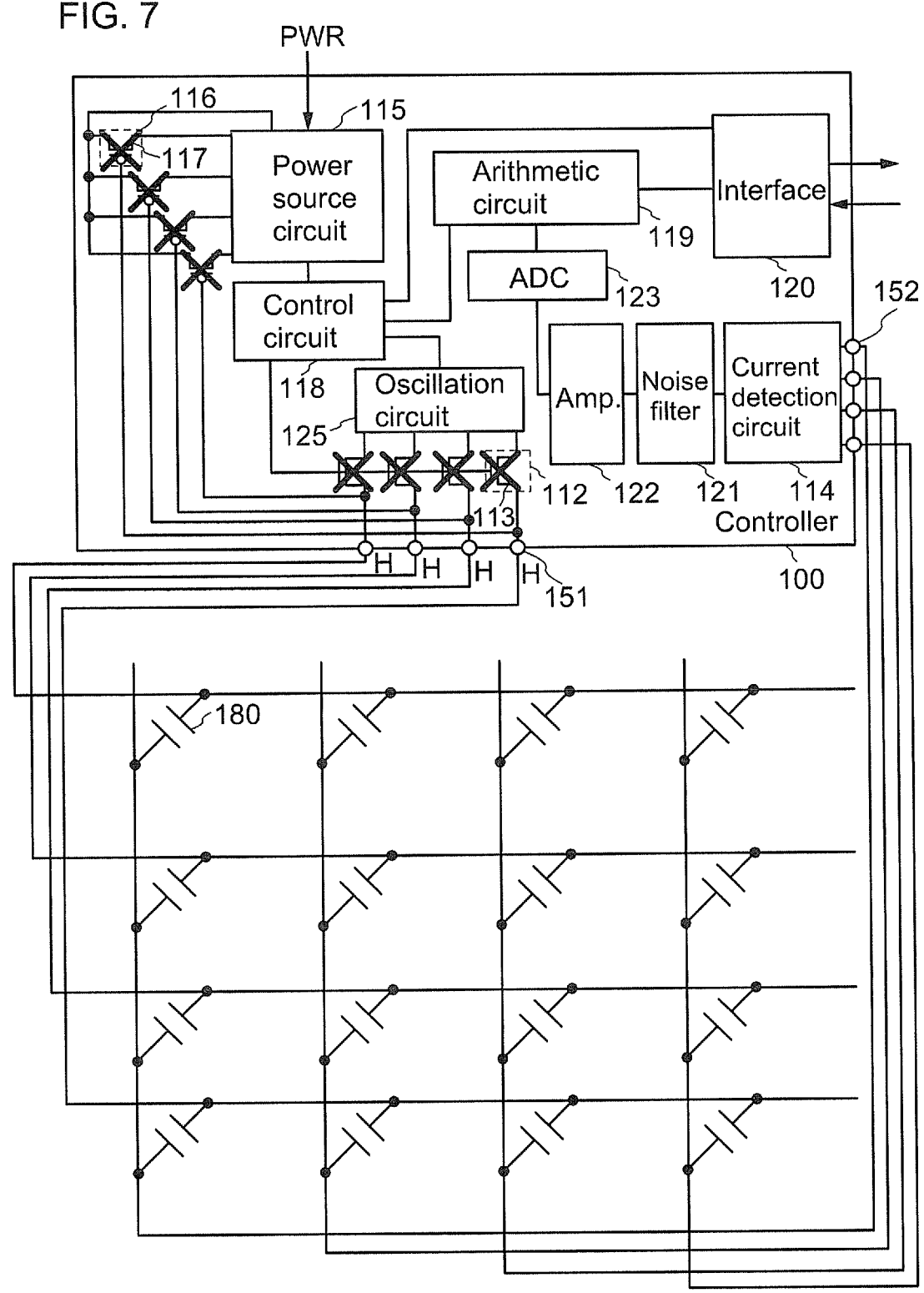
FIG. 7 is a diagram illustrating an example of a method for driving a controller.

In the low-power consumption mode, as illustrated in FIG. 7, the control switches 112 are turned off by the control circuit 118 after each one electrode of the pairs of electrodes of the capacitive sensors 180 is supplied with a high-level potential (H). For example, a pulse is input from the oscillation circuit 125 to each one electrode of the pairs of electrodes of the capacitive sensors 180, whereby each one electrode of the pairs of electrodes of the capacitive sensors 180 can be supplied with a high-level potential (H). Further, a pulse can be input from the oscillation circuit 125 to each one electrode of the pairs of electrodes of the capacitive sensors 180 in plural rows. Since the capacitive sensor 180 forms a capacitor, the potential of each one electrode of the pairs of electrodes of the capacitive sensors 180 is held. At this time, the control transistors 113 have low off-state current, and thus the potential of each one electrode of the pairs of electrodes of the capacitive sensors 180 can be held for a certain period of time.

When each one electrode of the pairs of electrodes of the capacitive sensors 180 has a high-level potential (H), the power supply start switches 116 are turned off. At this time, the circuit in which supply of the power source voltage by the power source circuit 115 is stopped or performed (e.g., one or more of the current detection circuit 114, the arithmetic circuit 119, the oscillation circuit 125, and the like) is brought into a low-power consumption driving state, and thus the controller is brought into a low-power consumption state. Accordingly, the controller is in a low-power consumption mode.

Next, whether there is a touch or not is determined in Step S6 shown in FIG. 5.

Figure 8:
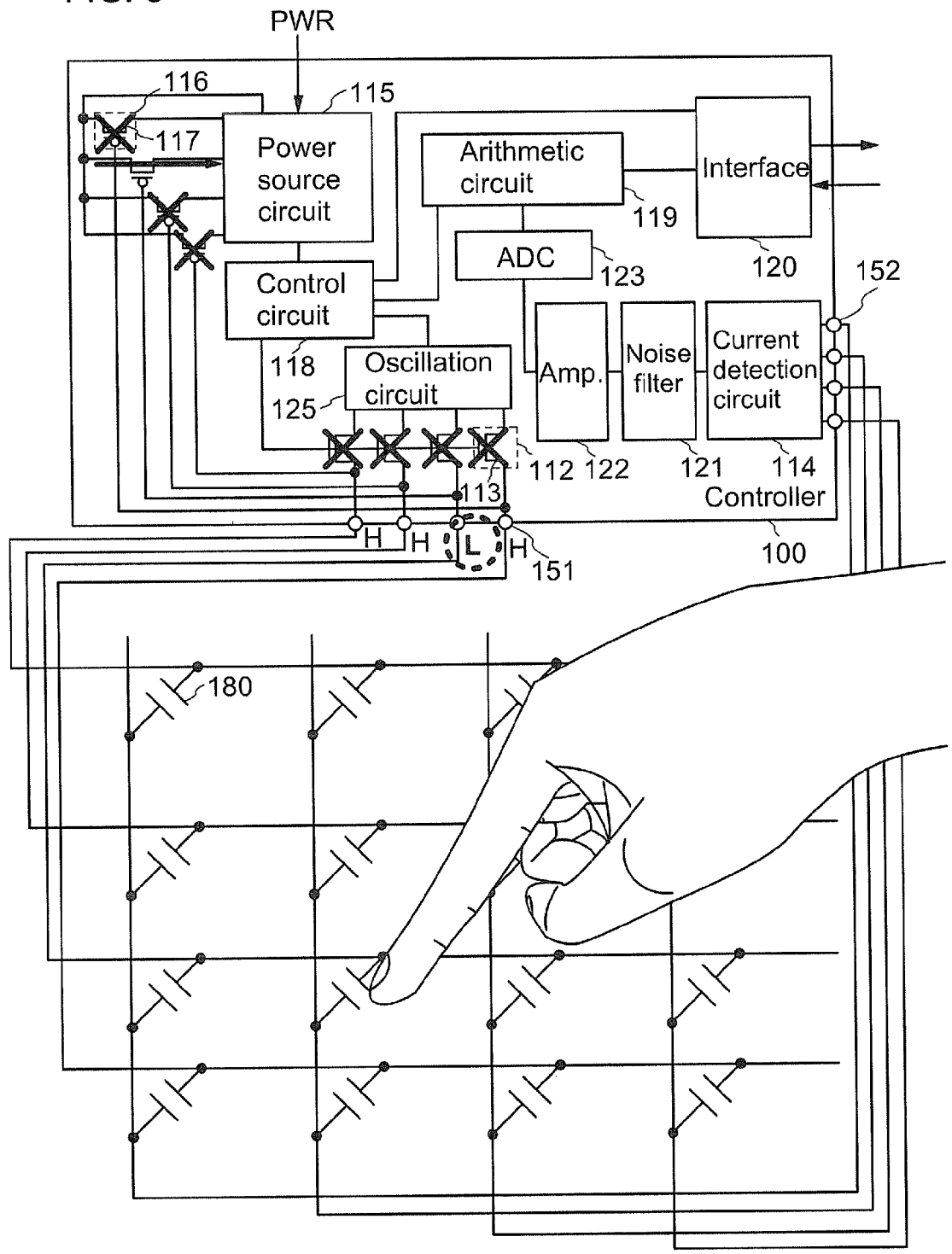
FIG. 8 is a diagram illustrating an example of a method for driving a controller.

In the case where there is a touch, for example, as illustrated in FIG. 8, the potential of one electrode of the capacitive sensor 180 whose current value is changed by the touch is changed (here, the potential of the one electrode of the capacitive sensor 180 is changed to a low-level potential (L)). At this time, the power supply start switch 116 which is connected to the capacitive sensor 180 having the one electrode through the connection terminal 151 is turned on, and thus a power supply start signal is input to the power source circuit 115. Note that the size of the capacitive sensor 180 is not limited to the size illustrated in FIG. 8.

The power source circuit 115 to which the power supply start signal has been input starts again supply of power source voltage to each circuit block. In this manner, the controller which can control the touch panel can return to the normal mode. Note that in the case where there is no touch, the operation is finished, and the low-power consumption mode is maintained.

The above is the description of the example of the method for driving the controller and the touch panel.

As illustrated in FIG. 1, FIG. 2, FIG. 3, FIG. 4, FIG. 5, FIG. 6, FIG. 7, and FIG. 8, in this embodiment, the power supply start switch is provided in the controller. Further, in the case where there is a touch in the low-power consumption mode, the power supply start switch is turned on and supply of power source voltage by the power source circuit is started again, and thus the controller which can control the touch panel returns to the normal mode. As described above, turning on or off the power supply start switch is automatically controlled depending on whether there is a touch or not without an additional detecting means; therefore, the circuit can be simplified. Further, an operation at the time when the controller which can control the touch panel returns to the normal mode can be performed by turning on or off the switch and thus can be simplified.

Embodiment 2

In this embodiment, structure examples of a controller and a touch panel are described.

Figure 9A:
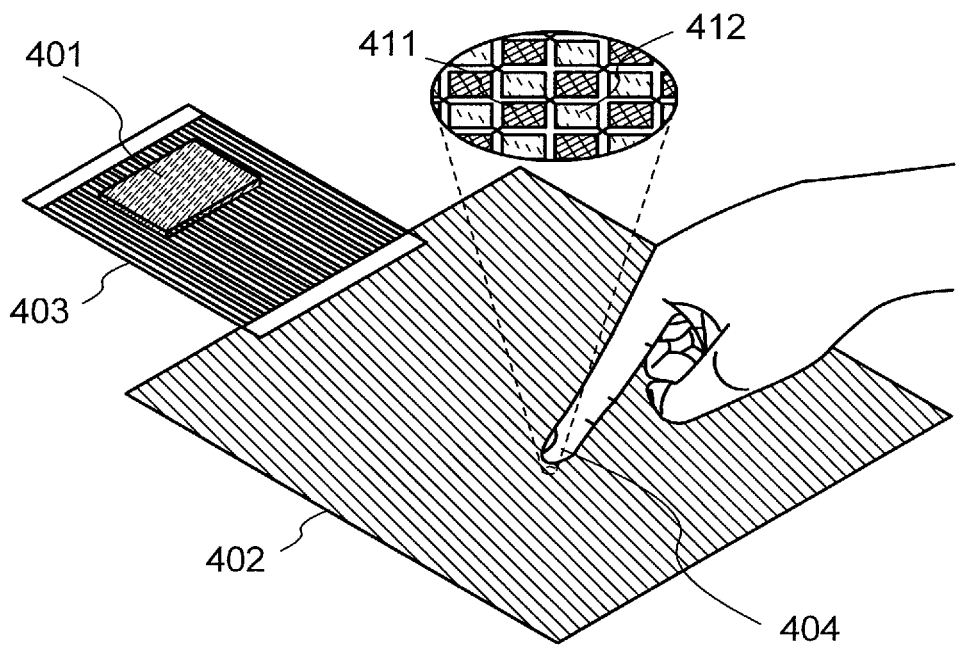
FIGS. 9A and 9B are diagrams illustrating a structure example of a controller and a touch panel.

A touch panel of this embodiment includes a controller 401 and a sensor panel 402 as illustrated in FIG. 9A.

As the controller 401, the controller 100 described in Embodiment 1 can be used.

The sensor panel 402 includes a plurality of electrodes 411 which are provided in a row direction and a plurality of electrodes 412 which are provided in a column direction. One of the plurality of electrodes 411 intersects with the plurality of electrodes 412 with an insulating layer interposed therebetween. The electrodes 411 each have a plurality of rectangular regions in a row direction, and the electrodes 412 each have a plurality of rectangular regions in a column direction. A region between each two rectangular regions of the plurality of rectangular regions in the electrode 411 overlaps with a region between each two rectangular regions of the plurality of rectangular regions in the electrode 412. Capacitance serving as the capacitive sensor is formed between one of the plurality of rectangular regions of the electrode 411 and one of the plurality of rectangular regions of the electrode 412. For example, in the case where the capacitive sensor is a mutual capacitance type sensor, the electrode 411 serves as a transmission electrode and the electrode 412 serves as a reception electrode.

The sensor panel 402 is electrically connected to the controller 401 through a flexible printed circuit (FPC) 403. The operation of the sensor panel 402 is controlled by the controller 401.

Further, the principle of the capacitive sensor illustrated in FIG. 9A is described with reference to FIG. 9B.

Figure 9B:
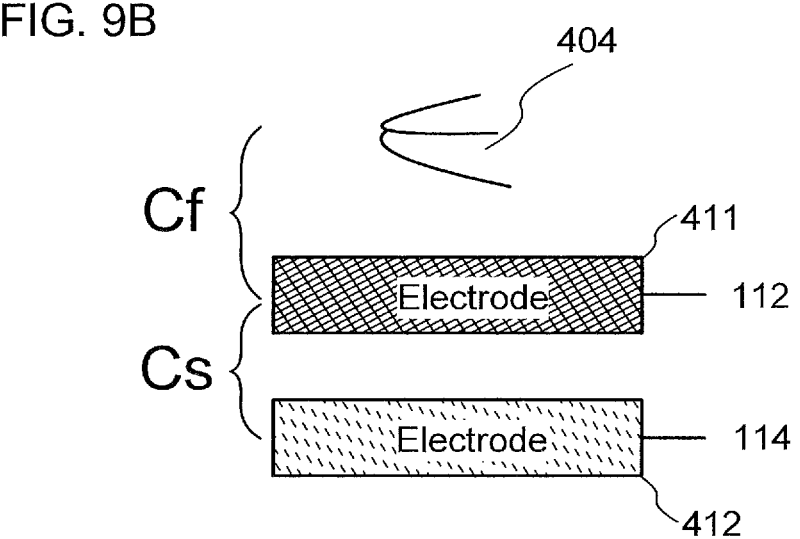

As illustrated in FIG. 9B, capacitance Cs denotes a capacitance which is formed by the electrode 411 and the electrode 412. The electrode 411 is connected to the control switch 112, and the electrode 412 is connected to the current detection circuit 114. Here, when a finger 404 approaches the electrode 411, Capacitance Cf which is parasitic capacitance is generated between the finger 404 and the electrode 411, and thus the value of current flowing through the electrode 412 is changed. Accordingly, the current detection circuit 114 detects the change of the value of the current flowing through the electrode 412, whereby whether the sensor panel is touched by the finger 404 or not can be determined.

Next, a structure example of a controller in this embodiment is described with reference to FIGS. 10A and 10B.

Figure 10A:
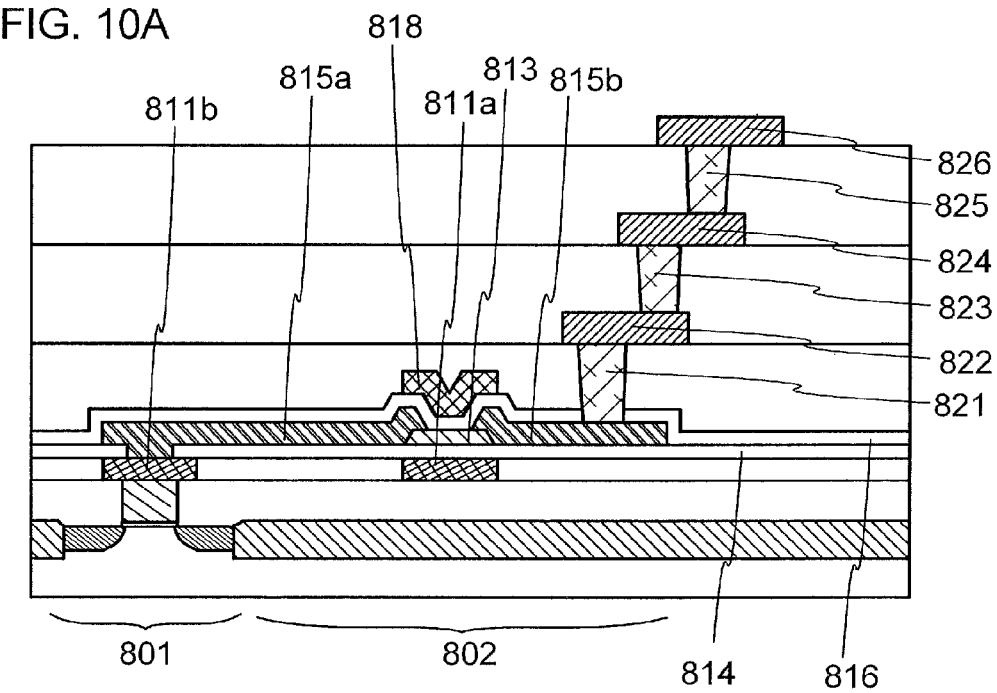
FIGS. 10A and 10B are schematic cross-sectional views illustrating examples of a structure of a controller.

In a controller illustrated in FIG. 10A, a transistor 801 containing silicon in a channel formation region and a transistor 802 containing an oxide semiconductor in a channel formation region are stacked and further a plurality of wiring layers are stacked over the transistor 802.

The transistor 801 is provided in a semiconductor substrate having an embedded insulating layer. The transistor 801 corresponds to the power supply selection transistor 117 illustrated in FIG. 1, for example.

The transistor 802 includes a conductive layer 811a embedded in an insulating layer, an insulating layer 814 over the conductive layer 811a, a semiconductor layer 813 which overlaps with the conductive layer 811a with the insulating layer 814 provided therebetween, conductive layers 815a and 815b which are electrically connected to the semiconductor layer 813, an insulating layer 816 over the semiconductor layer 813 and the conductive layers 815a and 815b, and a conductive layer 818 which overlaps with the semiconductor layer 813 with the insulating layer 816 provided therebetween. At this time, the conductive layer 811a functions as a back gate electrode. The insulating layer 814 functions as a gate insulating layer. The semiconductor layer 813 functions as a channel formation layer. Each of the conductive layers 815a and 815b functions as a source electrode or a drain electrode. The insulating layer 816 functions as a gate insulating layer. The conductive layer 818 functions as a gate electrode. The transistor 802 corresponds to the control transistor 113 illustrated in FIG. 1, for example.

It is preferred that the insulating layer 814 has a function of blocking impurities such as hydrogen. For example, an aluminum oxide layer, a silicon nitride layer, or the like has a function of blocking hydrogen. The semiconductor layer 813 is covered with the insulating layers 814 and 816 in the controller illustrated in FIG. 10A; therefore, diffusion of impurities such as hydrogen from the outside (e.g., the transistor 801) into the transistor 802 is suppressed.

Further, the conductive layer 815a is electrically connected to a conductive layer 811b formed using the same conductive film as the conductive layer 811a through an opening penetrating the insulating layer 814, and the conductive layer 811b is electrically connected to a gate electrode of the transistor 801.

Further, wiring layers 822, 824, and 826 are sequentially stacked over the transistor 802. The wiring layer 822 is electrically connected to the conductive layer 815b through a wiring layer 821 embedded in an insulating layer. The wiring layer 824 is electrically connected to the wiring layer 822 through a wiring layer 823 embedded in an insulating layer. The wiring layer 826 is electrically connected to the wiring layer 824 through a wiring layer 825 embedded in an insulating layer. For example, the wiring layer 826 may be used as the connection terminal 151 illustrated in FIG. 1.

Figure 10B:
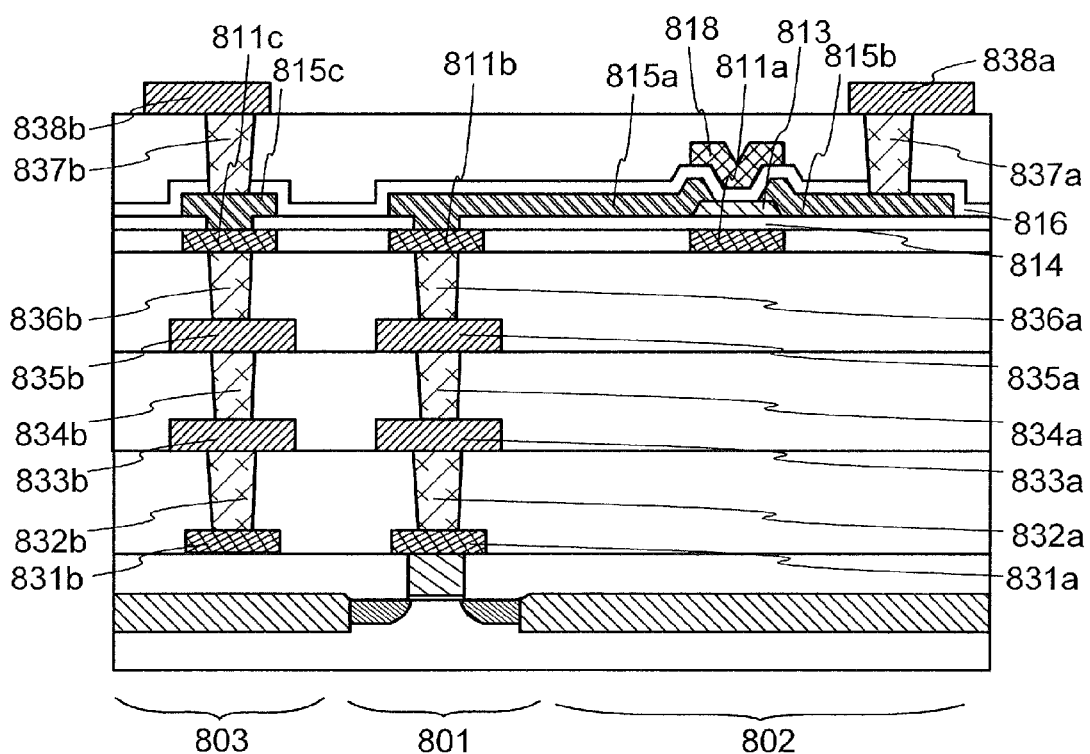

Further, in a controller illustrated in FIG. 10B, the transistor 801 and the transistor 802 are stacked, and further a plurality of wiring layers which are stacked are provided between the transistor 801 and the transistor 802. Further, a terminal portion 803 is also illustrated in FIG. 10B.

Further, wiring layers 831a, 833a, and 835a are sequentially stacked over the transistor 801. The wiring layer 831a is electrically connected to the gate electrode of the transistor 801. The wiring layer 833a is electrically connected to the wiring layer 831a through a wiring layer 832a embedded in an insulating layer. The wiring layer 835a is electrically connected to the wiring layer 833a through a wiring layer 834a embedded in an insulating layer.

Further, the conductive layer 815a is electrically connected to the conductive layer 811b formed using the same conductive film as the conductive layer 811a through the opening penetrating the insulating layer 814, and the conductive layer 811b is electrically connected to the wiring layer 835a through a wiring layer 836a embedded in an insulating layer.

Further, a wiring layer 838a is stacked over the transistor 802. The wiring layer 838a is electrically connected to the conductive layer 815b through a wiring layer 837a embedded in an insulating layer.

In the terminal portion 803, a wiring layer 831b formed using the same conductive film as the wiring layer 831a, a wiring layer 833b formed using the same conductive film as the wiring layer 833a, a wiring layer 835b formed using the same conductive film as the wiring layer 835a, a conductive layer 811c formed using the same conductive film as the conductive layer 811a, a conductive layer 815c formed using the same conductive film as the conductive layer 815a, a wiring layer 837b formed using the same conductive film as the wiring layer 837a, and a wiring layer 838b formed using the same conductive film as the wiring layer 838a are sequentially stacked. The wiring layer 833b is electrically connected to the wiring layer 831b through a wiring layer 832b which is embedded in the insulating layer and formed using the same conductive film as the wiring layer 832a. The wiring layer 835b is electrically connected to the wiring layer 833b through a wiring layer 834b which is embedded in the insulating layer and formed using the same conductive film as the wiring layer 834a. The conductive layer 811c is electrically connected to the wiring layer 835b through a wiring layer 836b which is embedded in the insulating layer and formed using the same conductive film as the wiring layer 836a. The conductive layer 815c is electrically connected to the conductive layer 811c through an opening penetrating the insulating layer 814. The wiring layer 838b is electrically connected to the conductive layer 815c through the wiring layer 837b which is embedded in the insulating layer and formed using the same conductive film as the wiring layer 837a. For example, the wiring layer 838b may be used as the connection terminal 151 or the connection terminal 152 illustrated in FIG. 1.

Further, components are described.

Each of the conductive layers 811a to 811c and the conductive layer 818 and the wiring layers 831a to 838a and the wiring layers 831b to 838b can be a layer containing a metal material such as molybdenum, titanium, chromium, tantalum, magnesium, silver, tungsten, aluminum, copper, neodymium, ruthenium, or scandium. Further, for each of the conductive layers 811a to 811c and the conductive layer 818 and the wiring layers 831a to 838a and the wiring layers 831b to 838b, graphene or the like may be used.

As each of the insulating layers including the insulating layer 814 and the insulating layer 816, a silicon oxide layer, a silicon nitride layer, a silicon oxynitride layer, a silicon nitride oxide layer, an aluminum oxide layer, an aluminum nitride layer, an aluminum oxynitride layer, an aluminum nitride oxide layer, a hafnium oxide layer, a gallium oxide layer, or the like can be used, for example. Further, an oxide layer of a gallium oxide, a Ga—Zn-based oxide, an In—Ga—Zn-based oxide containing In, Ga, and Zn at an atomic ratio of 1:3:2, or the like can be used.

As the semiconductor layer 813, a layer containing a material which can be applied to a channel formation layer of the control transistor 113 illustrated in FIG. 1 can be used, for example. In the semiconductor layer 813, an In—Ga—Zn-based oxide layer containing In, Ga, and Zn at an atomic ratio of 3:1:2 and an In—Ga—Zn-based oxide layer containing In, Ga, and Zn at an atomic ratio of 1:1:1 may be stacked.

In the case where an oxide semiconductor layer is used as the semiconductor layer 813, the oxide semiconductor layer can be highly purified in the following manner, for example: dehydration or dehydrogenation is performed so that impurities such as hydrogen, water, a hydroxyl group, and a hydride (also referred to as hydrogen compound) are removed from the oxide semiconductor layer, and oxygen is supplied to the oxide semiconductor layer. For example, a layer containing oxygen is used as the layer in contact with the oxide semiconductor layer, and heat treatment is performed; thus, the oxide semiconductor layer can be highly purified.

In addition, the oxide semiconductor layer that has just been formed is preferably supersaturated with oxygen so that the proportion of oxygen is higher than that in the stoichiometric composition. For example, in the case of using sputtering, the oxide semiconductor layer is preferably formed under the condition where the proportion of oxygen in a deposition gas is large, and particularly in an oxygen atmosphere (e.g., oxygen gas: 100%).

The oxide semiconductor film may be formed by a sputtering method at a substrate temperature higher than or equal to 100° C. and lower than or equal to 500° C., preferably higher than or equal to 200° C. and lower than or equal to 350° C.

Further, in order to sufficiently supply oxygen to supersaturate the oxide semiconductor layer with oxygen, an insulating layer which contains excess oxygen may be provided as each of the insulating layers (the insulating layers 814 and 816) in contact with the oxide semiconductor layer.

For example, the insulating layer containing excess oxygen can be formed as follows: the insulating layer is deposited using a sputtering method under the deposition conditions such that a large amount of oxygen is contained in the film. In order to make the insulating layer contain much more excess oxygen, oxygen is added by ion implantation, ion doping, or plasma treatment. Moreover, oxygen may be added to the oxide semiconductor layer.

In a sputtering apparatus, the amount of moisture remaining in a deposition chamber is preferably small. Therefore, an entrapment vacuum pump is preferably used in the sputtering apparatus. Further, a cold trap may be used.

In manufacture of the transistor, heat treatment is preferably performed. A temperature of the heat treatment is preferably higher than or equal to 350° C. and lower than the strain point of the substrate, preferably higher than or equal to 350° C. and lower than or equal to 450° C. Note that the heat treatment may be performed more than once.

As a heat treatment apparatus used for the heat treatment, a rapid thermal annealing (RTA) apparatus such as a gas rapid thermal annealing (GRTA) apparatus or a lamp rapid thermal annealing (LRTA) apparatus may be used. Alternatively, another heat treatment apparatus such as an electric furnace may be used.

After the heat treatment, a high-purity oxygen gas, a high-purity $N_2O$ gas, or ultra-dry air (having a dew point of −40° C. or lower, preferably −60° C. or lower) is preferably introduced in the furnace where the heat treatment has been performed while the heating temperature is being maintained or being decreased. In this case, it is preferable that the oxygen gas or the $N_2O$ gas do not contain water, hydrogen, and the like. The purity of the oxygen gas or the $N_2O$ gas which is introduced into the heat treatment apparatus is preferably 6N or higher, more preferably 7N or higher. That is, the impurity concentration of the oxygen gas or the $N_2O$ gas is preferably 1 ppm or lower, more preferably 0.1 ppm or lower. Through this step, oxygen is supplied to the oxide semiconductor layer, and defects due to oxygen vacancies in the oxide semiconductor layer can be reduced. Note that the introduction of a high-purity oxygen gas, a high-purity $N_2O$ gas, or ultra-dry air may be performed at the time of the above heat treatment.

The hydrogen concentration in the highly purified semiconductor layer which is measured by secondary ion mass spectrometry (also referred to as SIMS) is preferably lower than or equal to $5\times10^{19}$ atoms/cm$^3$, more preferably lower than or equal to $5\times10^{18}$ atoms/cm$^3$, and further preferably lower than or equal to $5\times10^{17}$ atoms/cm$^3$.

Each of the conductive layers 815a to 815c can be, for example, a layer containing a metal material such as molybdenum, titanium, chromium, tantalum, magnesium, silver, tungsten, aluminum, copper, neodymium, ruthenium, or scandium. Further, a metal oxide or the like may be used for each of the conductive layers 815a to 815c.

The above is the description of the structure example of the controller.

As described with reference to FIGS. 9A and 9B and FIGS. 10A and 10B, different transistors are stacked in the examples of the controller and the touch panel in this embodiment, whereby the circuit area can be reduced.

Embodiment 3

In this embodiment, examples of electronic devices each including a display panel using a touch panel which is one embodiment of the present invention are described with reference to FIGS. 11A to 11D.

Figure 11A:
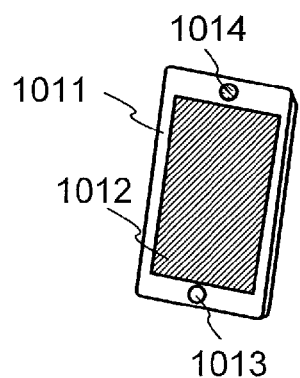
FIGS. 11A to 11D are diagrams each illustrating an example of an electronic device.

An electronic device in FIG. 11A is an example of a portable information terminal.

The electronic device illustrated in FIG. 11A has a housing 1011 and a panel 1012, a button 1013, and a speaker 1014 which are provided for the housing 1011.

The housing 1011 may be provided with a connection terminal for connecting the electronic device to an external device and a button for operating the electronic device.

The panel 1012 is a display panel (display).

The panel 1012 may be a touch panel which is one embodiment of the present invention. Thus, touch detection can be performed on the display panel.

The button 1013 is provided for the housing 1011. When the button 1013 is a power button, for example, pressing the button 1013 can turn on or off the electronic device.

The speaker 1014 is provided for the housing 1011. The speaker 1014 outputs sound.

Note that the housing 1011 may be provided with a microphone. Note that the housing 1011 may be provided with a microphone, in which case the electronic device illustrated in FIG. 11A can function as a telephone.

The electronic device illustrated in FIG. 11A functions as one or more of a telephone set, an e-book reader, a personal computer, and a game machine, for example.

Figure 11B:
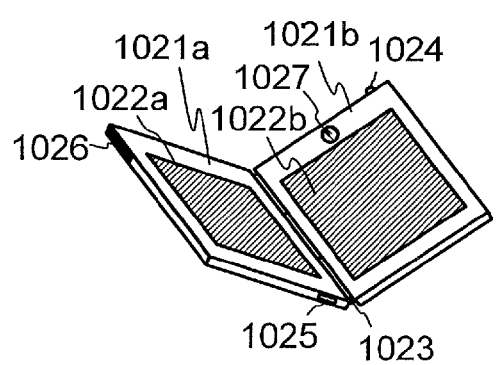

An electronic device illustrated in FIG. 11B is an example of a foldable information terminal.

The electronic device illustrated in FIG. 11B has a housing 1021a, a housing 1021b, a panel 1022a provided for the housing 1021a, a panel 1022b provided for the housing 1021b, a hinge 1023, a button 1024, a connection terminal 1025, a storage medium inserting portion 1026, and a speaker 1027.

The housing 1021a and the housing 1021b are connected by the hinge 1023.

The panels 1022a and 1022b are display panels (displays).

The panels 1022a and 1022b each may be a touch panel which is one embodiment of the present invention. Thus, touch detection can be performed on the display panels.

Since the electronic device in FIG. 11B includes the hinge 1023, it can be folded so that the panels 1022*a* and 1022*b* face each other.

The button 1024 is provided for the housing 1021*b*. Note that the housing 1021*a* may be provided with the button 1024. For example, when the button 1024 which functions as a power button is provided and pushed, supply of a power voltage to the electronic device can be controlled.

The connection terminal 1025 is provided for the housing 1021*a*. Note that the connection terminal 1025 may be provided on the housing 1021*b*. Alternatively, a plurality of connection terminals 1025 may be provided on one or both of the housings 1021*a* and 1021*b*. The connection terminal 1025 is a terminal for connecting the electronic device illustrated in FIG. 11B to another device.

The storage medium insertion portion 1026 is provided for the housing 1021*a*. The storage medium insertion portion 1026 may be provided on the housing 1021*b*. Alternatively, a plurality of storage medium insertion portions 1026 may be provided on one or both of the housings 1021*a* and 1021*b*. For example, a card storage medium is inserted into the recording medium insertion portion so that data can be read to the electronic device from the card storage medium or data stored in the electronic device can be written to the card storage medium.

The speaker 1027 is provided for the housing 1021*b*. The speaker 1027 outputs sound. Note that the speaker 1027 may be provided for the housing 1021*a*.

Note that the housing 1021*a* or the housing 1021*b* may be provided with a microphone. The housing 1021*a* or the housing 1021*b* may be provided with a microphone, in which case the electronic device in FIG. 11B can function as a telephone, for example.

The electronic device illustrated in FIG. 11B has functions as one or more of a telephone set, an e-book reader, a personal computer, and a game machine, for example.

Figure 11C:
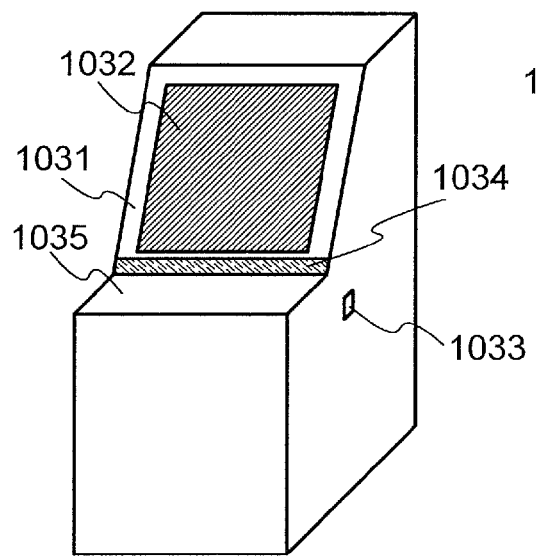

An electronic device in FIG. 11C is an example of a stationary information terminal. The electronic device illustrated in FIG. 11C has a housing 1031, and a panel 1032, a button 1033, and a speaker 1034 that are provided for the housing 1031.

The panel 1032 is a display panel (display).

The panel 1032 may be a touch panel which is one embodiment of the present invention. Thus, touch detection can be performed on the display panel.

Note that a panel similar to the panel 1032 may be provided for a deck portion 1035 of the housing 1031.

The housing 1031 may be provided with one or more of a ticket slot from which a ticket or the like is dispensed, a coin slot, and a bill slot.

The button 1033 is provided for the housing 1031. For example, when the button 1033 is a power button, supply of a power source voltage to the electronic device can be controlled by pressing the button 1033.

The speaker 1034 is provided for the housing 1031. The speaker 1034 outputs sound.

The electronic device illustrated in FIG. 11C has, for example, a function as an automated teller machine, an information communication terminal for ordering a ticket or the like (also referred to as a multi-media station), or a game machine.

Figure 11D:
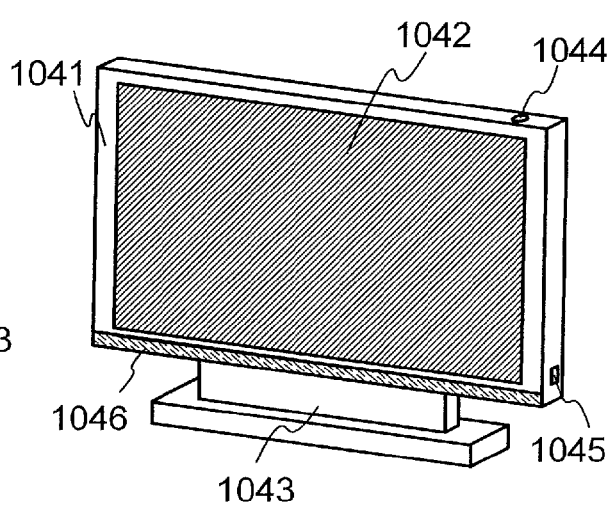

FIG. 11D illustrates another example of a stationary information terminal. The electronic device illustrated in FIG. 11D has a housing 1041, and a panel 1042, a button 1044, a connection terminal 1045, and a speaker 1046 that are provided for the housing 1041, and a support base 1043 supporting the housing 1041.

Note that a connection terminal for connecting the housing 1041 to an external device may be provided.

The panel 1042 functions as a display panel (display).

The panel 1042 may be a touch panel which is one embodiment of the present invention. Thus, touch detection can be performed on the display panel.

The button 1044 is provided for the housing 1041. For example, when the button 1044 is a power button, supply of a power voltage to the electronic device can be controlled by pressing the button 1044.

The connection terminal 1045 is provided for the housing 1041. The connection terminal 1045 is a terminal for connecting the electronic device illustrated in FIG. 11D to another device. For example, when the electronic device in FIG. 11D and a personal computer are connected with the connection terminal 1045, the panel 1042 can display an image corresponding to a data signal input from the personal computer. For example, when the panel 1042 of the electronic device illustrated in FIG. 11D is larger than a panel of an electronic device connected thereto, a displayed image of the electronic device can be enlarged, in which case a plurality of viewers can recognize the image at the same time with ease.

The speaker 1046 is provided for the housing 1041. The speaker 1046 outputs sound.

The electronic device illustrated in FIG. 11D functions as, for example, an output monitor, a personal computer, and/or a television set.

The above is the description of the electronic devices illustrated in FIGS. 11A to 11D.

As described with reference to FIGS. 11A to 11D, a display panel including the touch panel of one embodiment of the present invention, which is provided in each of the electronic devices of this embodiment enables touch detection.

This application is based on Japanese Patent Application serial No. 2012-124155 filed with the Japan Patent Office on May 31, 2012, the entire contents of which are hereby incorporated by reference.

What is claimed is:

1. A controller controlling an operation of a capacitive sensor, the controller comprising:
    a control switch configured to control supply of a potential to one electrode of the capacitive sensor;
    a current detection circuit configured to detect current flowing through the other electrode of the capacitive sensor;
    a power source circuit configured to control supply of power source voltage to the current detection circuit in accordance with a power supply start signal to be input;
    a power supply start switch including a power supply selection transistor whose gate potential is changed in accordance with a potential of the one electrode and configured to control output of the power supply start signal to the power source circuit in accordance with a gate potential of the power supply selection transistor; and
    a control circuit configured to control the control switch and the power source circuit.

2. The controller according to claim 1, wherein the control switch includes a control transistor in which an off-state current per micrometer of a channel width is lower than or equal to 100 zA, a gate potential is controlled by the control circuit, and the supply of the potential is controlled by being turned on or off.

3. The controller according to claim 2,
    wherein the control transistor includes an oxide semiconductor in a channel formation region,
    wherein the oxide semiconductor has a wider band gap than silicon, and includes a layer in which a c-axis is aligned in a direction parallel to one of a normal vector of a surface where the oxide semiconductor is formed, and a normal vector of a surface of the oxide semiconductor, and wherein the layer has a triangular or a hexagonal atomic arrangement when seen from a direction perpendicular to an a-b plane, and a metal atomic arrangement in a layered manner or a metal atom and oxygen atomic arrangement in a layered manner when seen from a direction perpendicular to the c-axis.

4. A touch panel comprising:
a capacitive sensor; and
a controller,
wherein the controller comprises:
   a control switch configured to control supply of a potential to one electrode of the capacitive sensor;
   a current detection circuit configured to detect current flowing through the other electrode of the capacitive sensor;
   a power source circuit configured to control supply of power source voltage to the current detection circuit in accordance with a power supply start signal to be input;
   a power supply start switch including a power supply selection transistor whose gate potential is changed in accordance with a potential of the one electrode and configured to control output of the power supply start signal to the power source circuit in accordance with a gate potential of the power supply selection transistor; and
   a control circuit configured to control the control switch and the power source circuit.

5. The touch panel according to claim 4, wherein the control switch includes a control transistor in which an off-state current per micrometer of a channel width is lower than or equal to 100 zA, a gate potential is controlled by the control circuit, and the supply of the potential is controlled by being turned on or off.

6. The touch panel according to claim 5,
wherein the control transistor includes an oxide semiconductor in a channel formation region,
wherein the oxide semiconductor has a wider band gap than silicon, and includes a layer in which a c-axis is aligned in a direction parallel to one of a normal vector of a surface where the oxide semiconductor is formed and a normal vector of a surface of the oxide semiconductor, and
wherein the layer has a triangular or a hexagonal atomic arrangement when seen from a direction perpendicular to an a-b plane, and a metal atomic arrangement in a layered manner or a metal atom and oxygen atomic arrangement in a layered manner when seen from a direction perpendicular to the c-axis.

7. An electronic device comprising the touch panel according to claim 4 in a display panel.

8. The electronic device according to claim 7, wherein the electronic device is one selected from the group consisting of a telephone, an e-book reader, an automated teller machine, and a television set.

* * * * *